(12) United States Patent
Huber, Jr. et al.

(10) Patent No.: US 7,377,370 B2
(45) Date of Patent: *May 27, 2008

(54) PARKING BRAKE SYSTEM INCLUDING A BRAKE CYLINDER

(75) Inventors: Howard E. Huber, Jr., Black River, NY (US); Simon Czypionka, Munich (DE)

(73) Assignee: New York Air Brake Corporation, Watertown, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 11/477,856

(22) Filed: Jun. 30, 2006

(65) Prior Publication Data

US 2006/0244307 A1   Nov. 2, 2006

Related U.S. Application Data

(63) Continuation of application No. 11/035,064, filed on Jan. 14, 2005, now Pat. No. 7,163,090, which is a continuation-in-part of application No. 10/752,543, filed on Jan. 8, 2004, now Pat. No. 7,249,659.

(51) Int. Cl.
*F16D 65/24* (2006.01)
(52) U.S. Cl. .................................... 188/170
(58) Field of Classification Search ............... 188/166, 188/167, 170, 265, 33
See application file for complete search history.

(56) References Cited

U.S. PATENT DOCUMENTS

| | | |
|---|---|---|
| 3,944,286 A | 3/1976 | Engle et al. |
| 4,019,426 A | 4/1977 | Wosegien et al. |
| 4,493,246 A | 1/1985 | Dalibout |
| 4,544,047 A | 10/1985 | Clemmons et al. |
| 4,653,812 A | 3/1987 | Engle |
| 4,746,171 A | 5/1988 | Engle |
| 4,799,741 A | 1/1989 | Engle |
| 4,874,065 A | 10/1989 | Engle |
| 4,978,178 A | 12/1990 | Engle |
| 5,069,312 A | 12/1991 | Kanjo et al. |
| 5,469,941 A | 11/1995 | Horvath |
| 5,495,921 A | 3/1996 | Samulak et al. |
| 5,701,975 A | 12/1997 | Hawryszkow |
| 5,738,416 A | 4/1998 | Kanjo et al. |
| 5,848,550 A * | 12/1998 | Cathcart et al. .................. 74/2 |
| 5,937,974 A * | 8/1999 | Cathcart et al. ............ 188/203 |
| 6,186,284 B1 | 2/2001 | Sauter et al. |
| 6,227,520 B1 | 5/2001 | Huber, Jr. |
| 6,375,278 B1 | 4/2002 | Sauter et al. |
| 6,378,668 B1 | 4/2002 | Zemyan et al. |
| 6,394,559 B1 | 5/2002 | Ring et al. |
| 6,397,978 B1 | 6/2002 | Jackson et al. |
| 6,427,811 B1 | 8/2002 | Wedge et al. |
| 6,431,329 B1 | 8/2002 | Huber, Jr. et al. |

(Continued)

*Primary Examiner*—Melanie Torres
(74) *Attorney, Agent, or Firm*—Barnes & Thornburg LLP

(57) ABSTRACT

A brake system for a rail vehicle including a brake cylinder having a housing, a port on the housing for receiving fluid pressure signals, a pressure piston carried inside the housing, and a shaft inside the housing. The shaft is connected at one end to the pressure piston and at the other end to a device to apply and release the brakes of the rail vehicle. A parking brake locking mechanism is located inside the housing and includes first and second elements cooperating to lock and unlock the parking brake locking mechanism. Further included is a device for unlocking the parking brake locking mechanism from the locked position.

12 Claims, 11 Drawing Sheets

U.S. PATENT DOCUMENTS 6,435,321 B1 * 8/2002 Asano .................. 188/170
6,491,141 B1 * 12/2002 Severinsson ............ 188/170
6,854,570 B2 2/2005 Connell
7,163,090 B2 * 1/2007 Huber et al. ............ 188/170
2004/0079598 A1 * 4/2004 Grundwurmer et al. .... 188/166
2004/0226779 A1 11/2004 Connell
2005/0092563 A1 5/2005 McCann et al.
2005/0179315 A1 8/2005 Severinsson

* cited by examiner

PARKING BRAKE SYSTEM INCLUDING A BRAKE CYLINDER

CROSS-REFERENCE

This is a continuation application of U.S. application, Ser. No. 11/035,064, filed on Jan. 14, 2005 now U.S. Pat. No. 7,163,090, which is a Continuation-in-Part of 10/752,543 filed Jan. 8, 2004 now U.S. Pat. No. 7,249,659, both of the disclosures are hereby incorporated by reference herein.

BACKGROUND

The present disclosure relates to brake systems for rail vehicles and more specifically, to brake systems including brake cylinders and parking brakes. Parking brakes for rail vehicles are known, for example, from U.S. Pat. Nos. 6,186,284 and 6,431,329. Parking brakes for tractor/trailer truck applications are known, for example, from the SD-3 Roto Safety Actuator manufactured by Bendix Corporation.

SUMMARY

According to the present disclosure, a brake system includes a brake cylinder responsive to fluid pressure signals from a fluid-charged brake pipe to apply and release brakes of a rail vehicle, a parking brake locking mechanism located inside the brake cylinder, and means for unlocking a parking brake locking mechanism from a locked position without moving a pressure piston located inside the brake cylinder.

The brake cylinder includes a housing, a port on the housing for receiving fluid pressure signals, and a shaft enclosed inside the housing, the shaft being connected at one end to the pressure piston and at the other end to a device to apply and release the brakes of the rail vehicle.

The parking brake locking mechanism includes first and second elements that cooperate to lock and unlock the locking mechanism.

The means for unlocking the locked parking brake includes applying a force directly on the second element of the locking mechanism to disengage the second element from the first element. The force includes fluid pressure from the fluid-charged brake pipe and/or a movable device mounted on the housing.

Other aspects of the present disclosure will become apparent from the following descriptions when considered in conjunction with the accompanying drawings.

DETAILED DESCRIPTION

Figure 11:
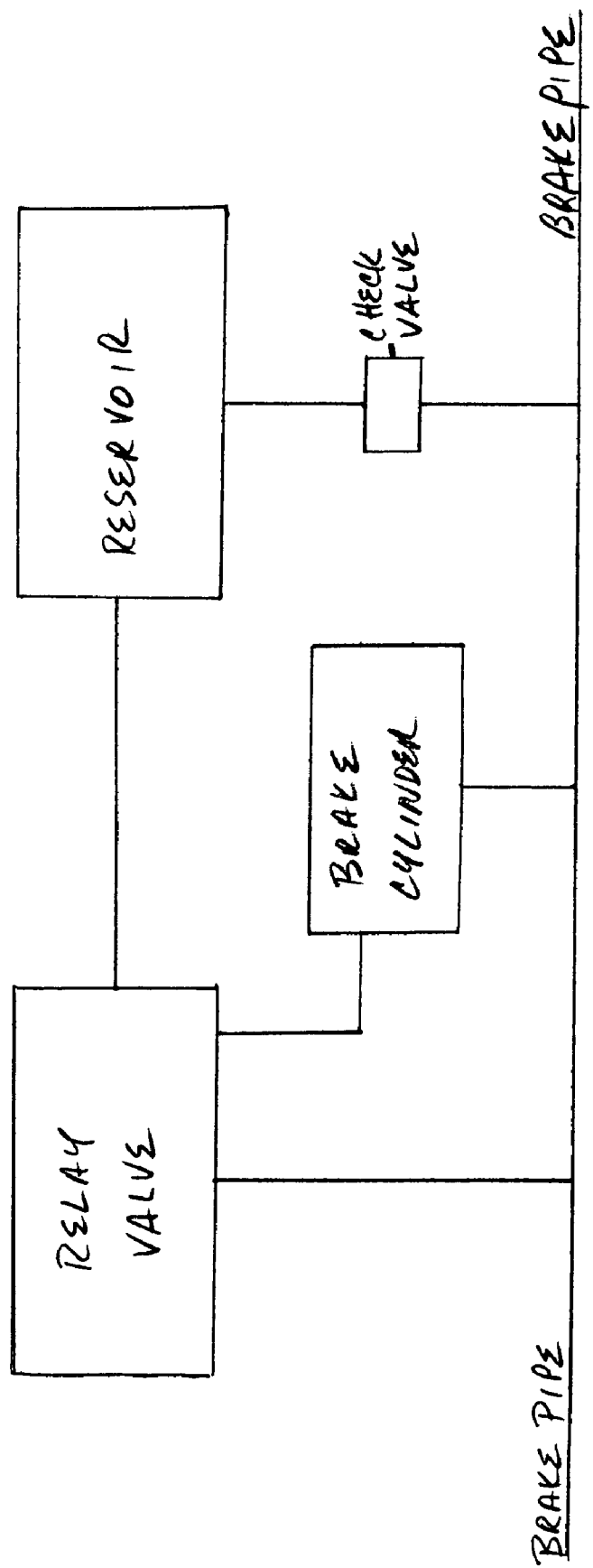
FIG. 11 is a schematic representation of a brake system for a train, according to the present disclosure.

Generally, the present disclosure relates to a brake system for rail vehicles, which rail vehicles include locomotives and rail cars. FIG. 11 is a simplified example of a braking system for a train. Normally, one or more locomotives and a series of rail cars are coupled together to form a train. Each of the rail vehicles includes a brake cylinder having a pressure piston that is used to apply and release the vehicle's brakes in response to fluid pressure signals from a brake pipe. The pressure signals are transmitted to a relay valve that causes fluid from a reservoir to be applied at a port of the brake cylinder. As represented in FIG. 11, the brake cylinder also receives fluid pressure directly from the brake pipe at a separate port. It should be noted that other types of train brake systems can use brake valves that are different from those shown in FIG. 11, such as, for example, the DB-60 from New York Air Brake. The brakes are pneumatically operated. Each rail vehicle usually also includes a parking brake, that may or may not utilize the rail vehicle's brake cylinder, to hold a stopped or parked vehicle in place. Although the description herein refers to a brake system for rail vehicles, it is within the scope of the present disclosure that the brake system is applicable to other types of vehicles, for example, tractor/trailer truck applications, as well.

The brake system of the present disclosure includes and uses the same brake cylinder for a parking brake as is used to apply and release the rail vehicle's brakes during normal rail vehicle operations. A parking brake locking mechanism is included in the brake cylinder to lock the rail vehicle's brakes in an applied position, thereby acting as a parking brake. To unlock or release the parking brake (or, the parking brake locking mechanism), a force is applied directly to the locking mechanism without needing to move the pressure piston of the brake cylinder.

The brake system of the present disclosure includes a brake cylinder 10, as shown in FIGS. 1-4. The brake cylinder 10 includes a housing 12 having a pressure body 14 and a cover 16. A pressure piston 18 is carried inside the housing 12. A first shaft 20, which is shown as being threaded, is located inside the housing 12 and is connected at one end to the pressure piston 18 and at the other end to a second shaft 21. Second shaft 21 is coupled to a rod 22 that is configured to cooperate with other elements of the train's braking system (not shown) to apply and release the rail vehicle's brakes. The brake cylinder 10 also includes a first port 24 on the housing 12 configured to receive fluid pressure signals from the reservoir in response to signals on brake pipe 28 of the train's pneumatic brake system to apply and release the rail vehicle brakes. When the rail vehicle's brakes are being applied, pressure piston 18 is moved to the right, as viewed in FIG. 3 (a brake applied position is not shown). Brake cylinder 10 also includes a spring 26 that returns the pressure piston 18 to the left or to a released position, as shown, for example, in FIGS. 2-3 when the brake pressure is removed from port 24.

A second port 40 on the housing 12 is configured to receive fluid pressure from the brake pipe 28 of the train. The fluid pressure entering at second port 40 causes a force to be applied on a parking brake locking mechanism 30 located inside the housing 12. A parking brake release pressure is the result of charging the brake pipe 28 during start up. The braking signal in the brake pipe occurs from a drop in pressure in the brake pipe 28.

Figure 6:
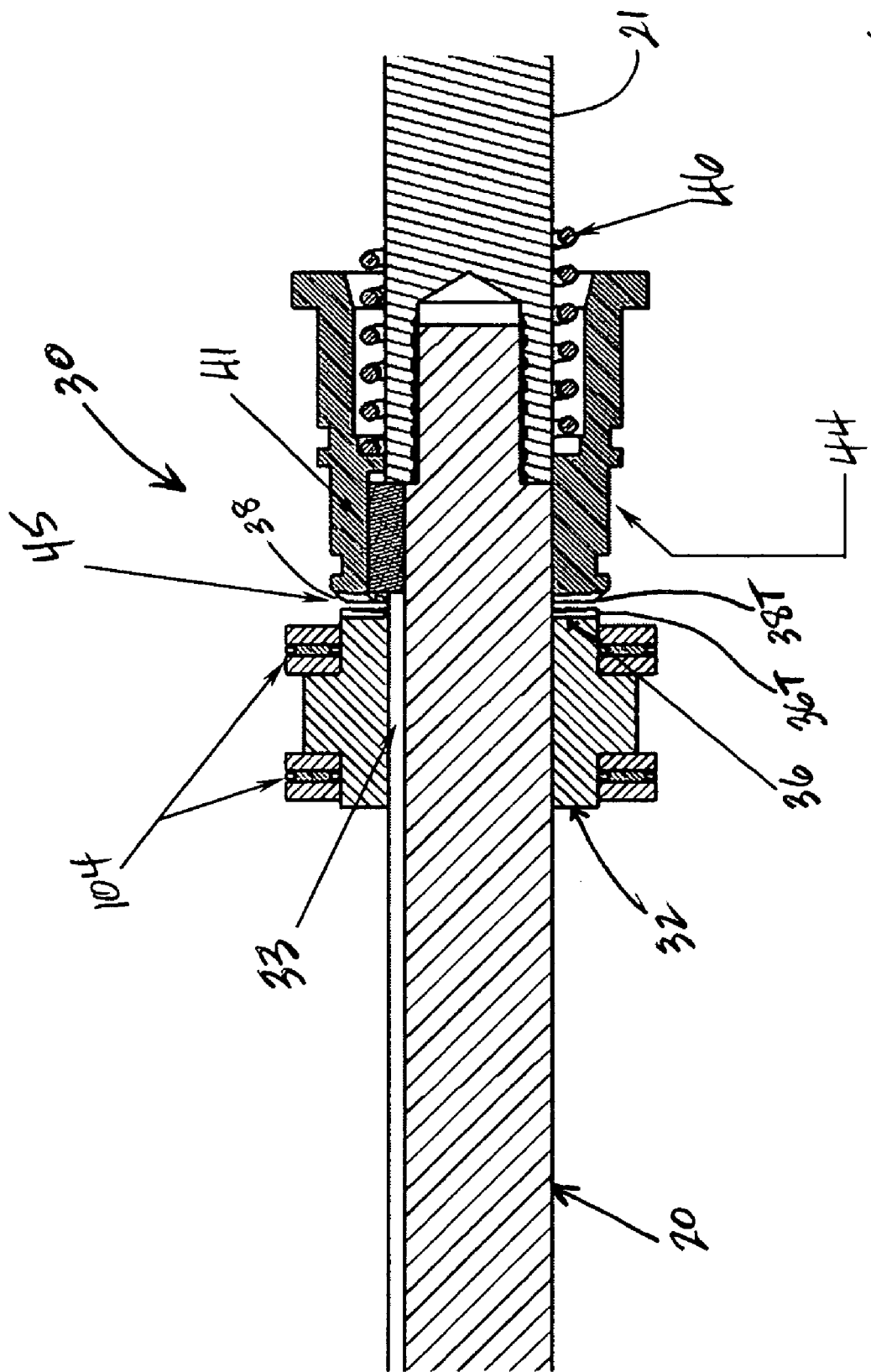
FIG. 6 is an enlarged section view of the locking mechanism of the present disclosure, similar to FIG. 6, the locking mechanism being in an unlocked position.

The parking brake locking mechanism 30 includes a first element, shown as a rotatable locking nut 32 rotatable about threaded first shaft 20, as shown at 33. Locking mechanism 30 also includes a second element, shown as a locking sleeve 34. The rotatable nut 32, which includes a first surface 36 having, for example, teeth 36T thereon, as shown in FIG. 6, and the locking sleeve 34, which includes a second surface 38 having, for example, teeth 38T thereon, as shown in FIG. 6, cooperate to lock and unlock the parking brake locking mechanism 30. A pin 41 prevents locking sleeve 34 from rotating about first shaft 20, but locking sleeve 34 is movable or slidable axially relative to shafts 20 and 21. Pin 41 is set in a groove 35 of shaft 21 (see FIG. 4).

Figure 1:
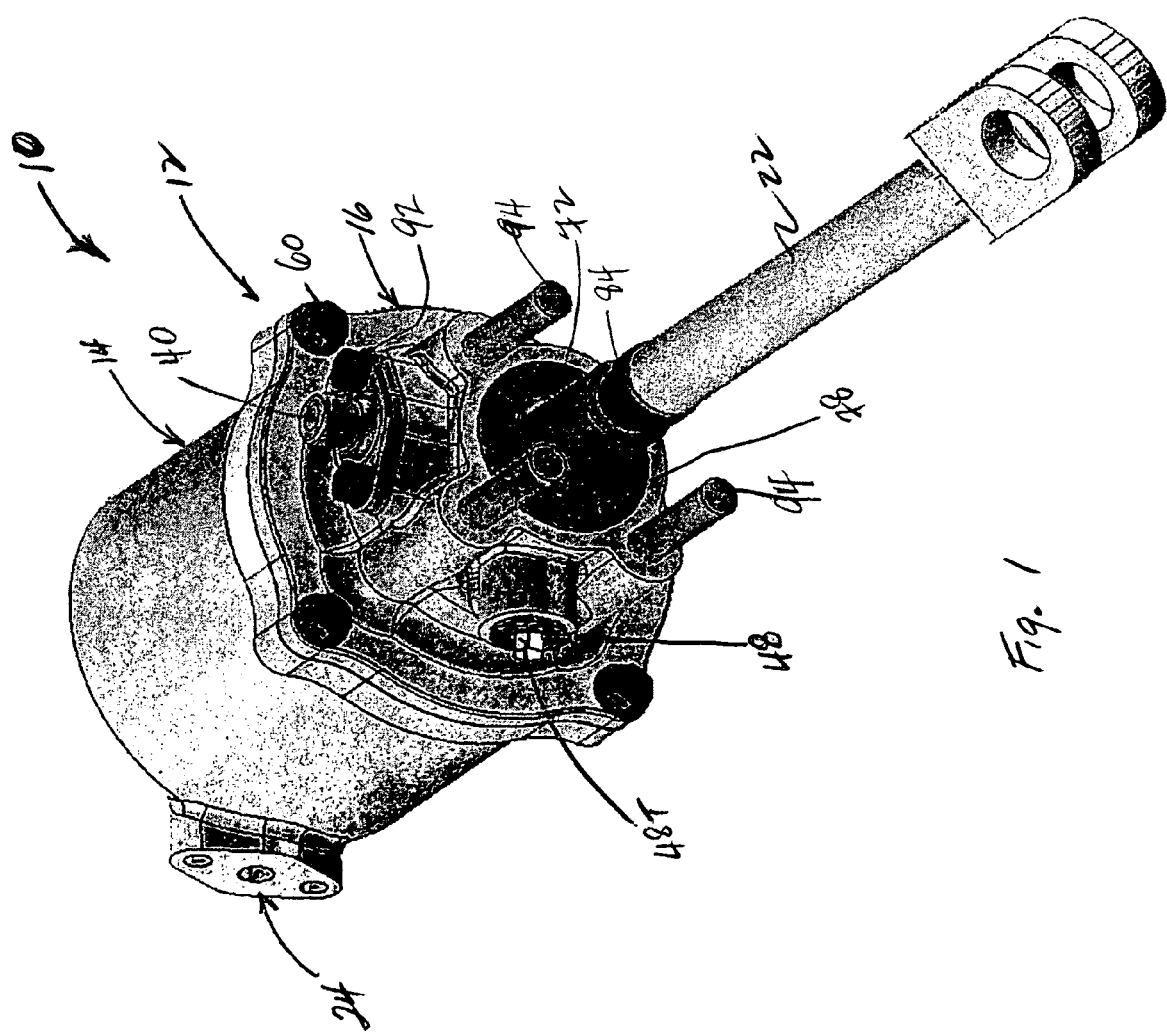
FIG. 1 is a perspective view of an embodiment of a brake system, according to the present disclosure.
Figure 2:
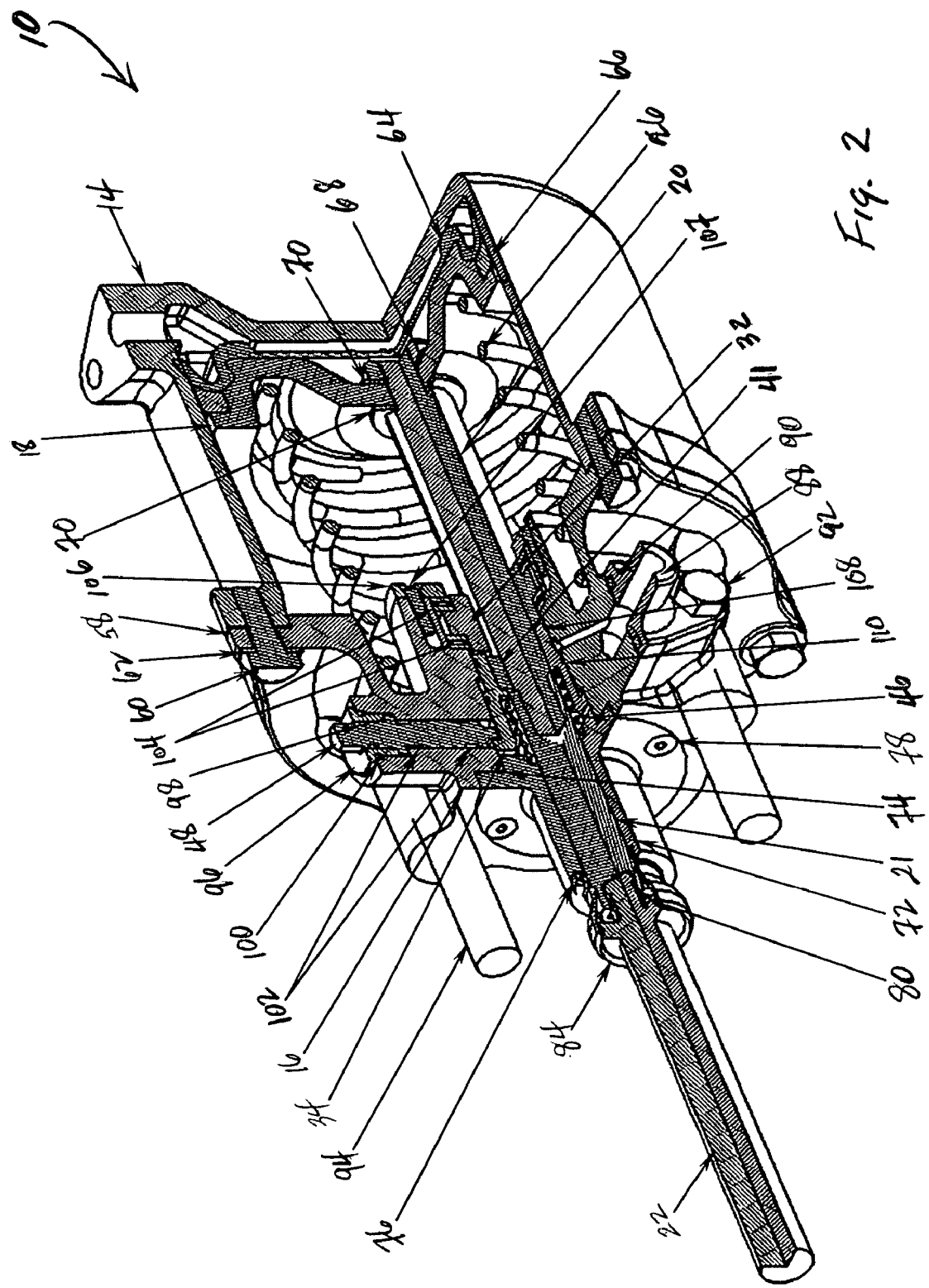
FIG. 2 is a cut-a-way, perspective sectional view of the brake cylinder of FIG. 1.
Figure 3:
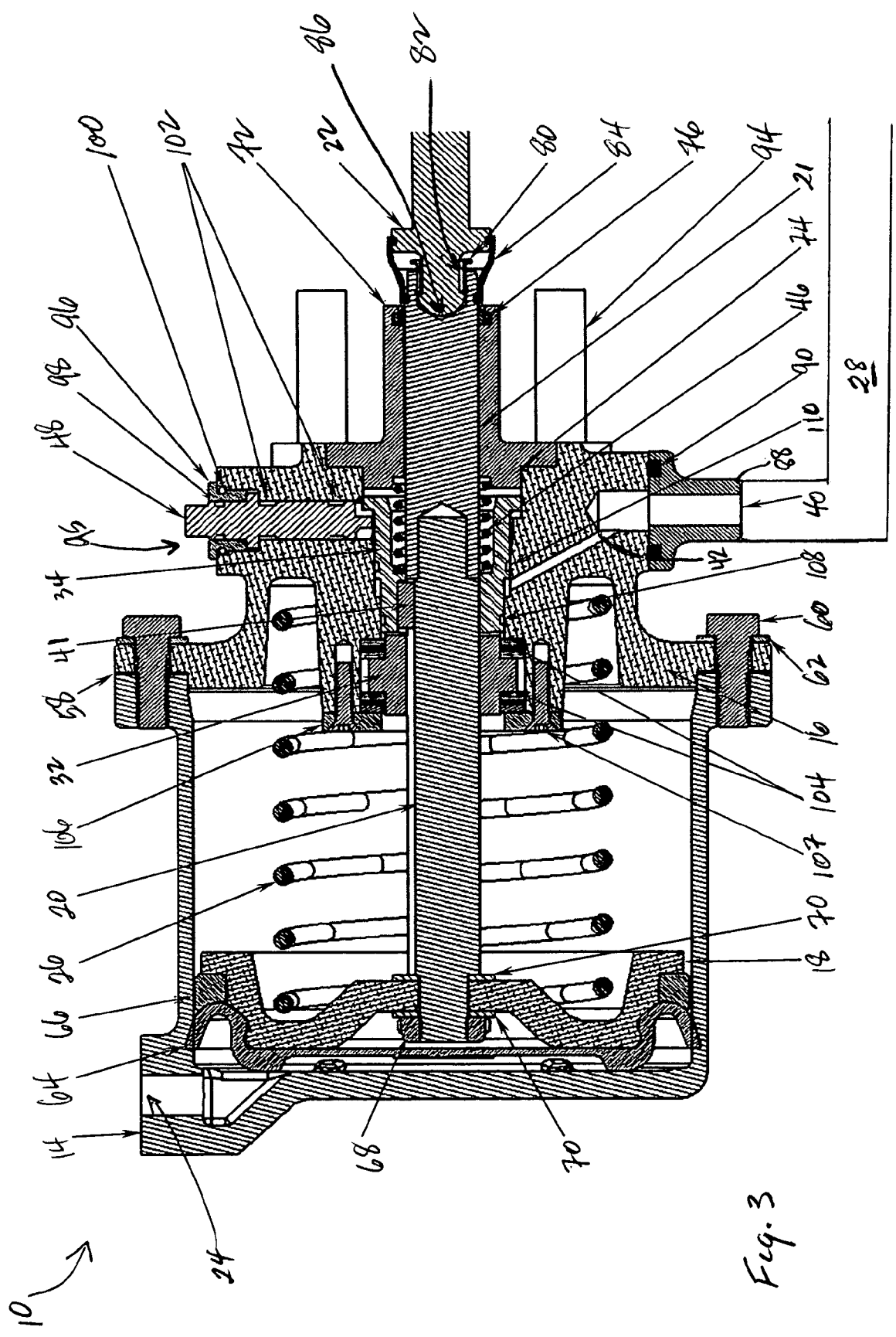
FIG. 3 is an enlarged sectional view of the brake cylinder of FIG. 2 showing the locking mechanism, a brake pipe connected to the brake pipe pressure port, a conduit for feeding brake pipe pressure to the locking mechanism, and the movable element configured as a rotatable stem.
Figure 4:
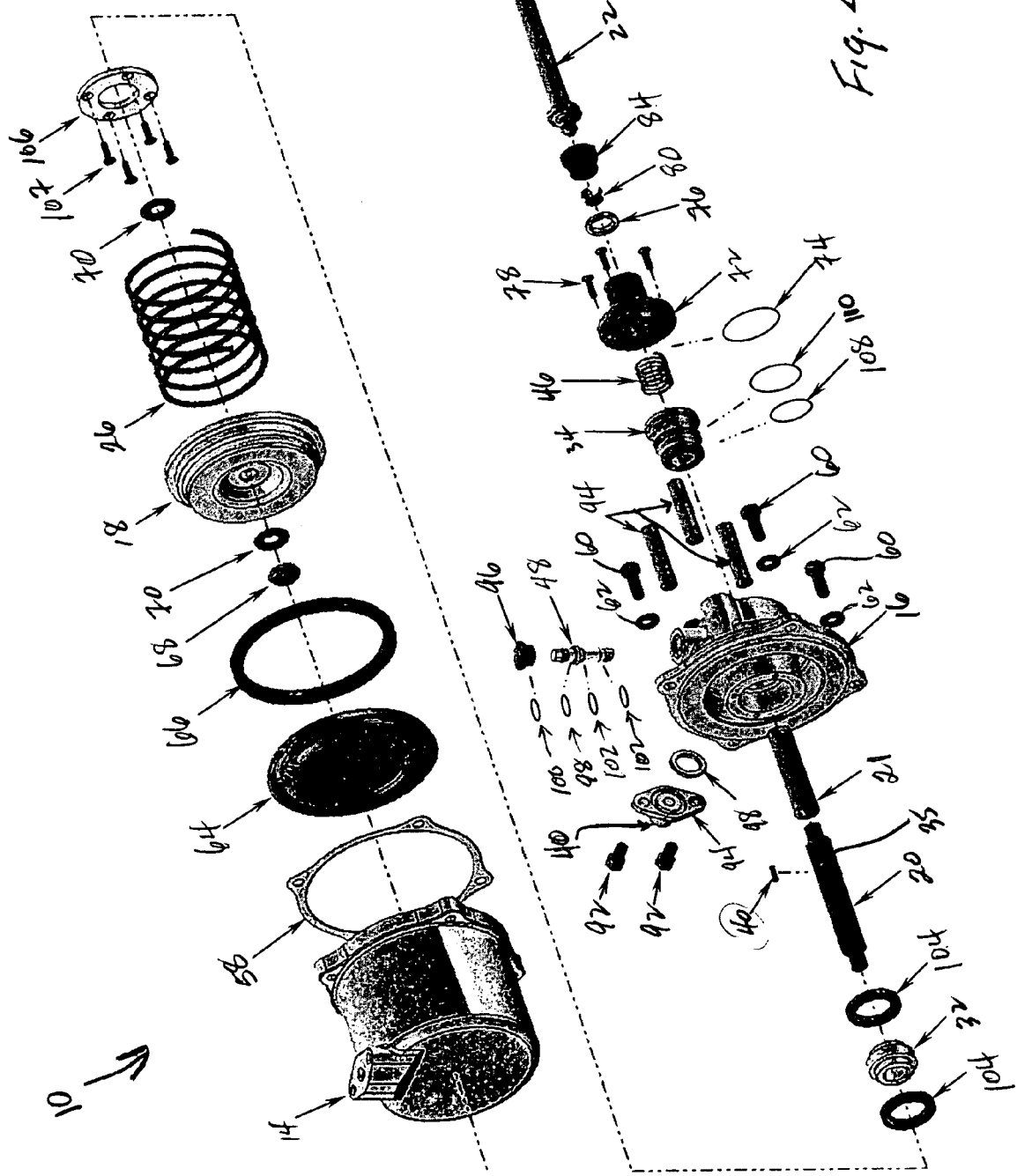
FIG. 4 is an exploded view of the brake cylinder of FIG. 2.
Figure 5:
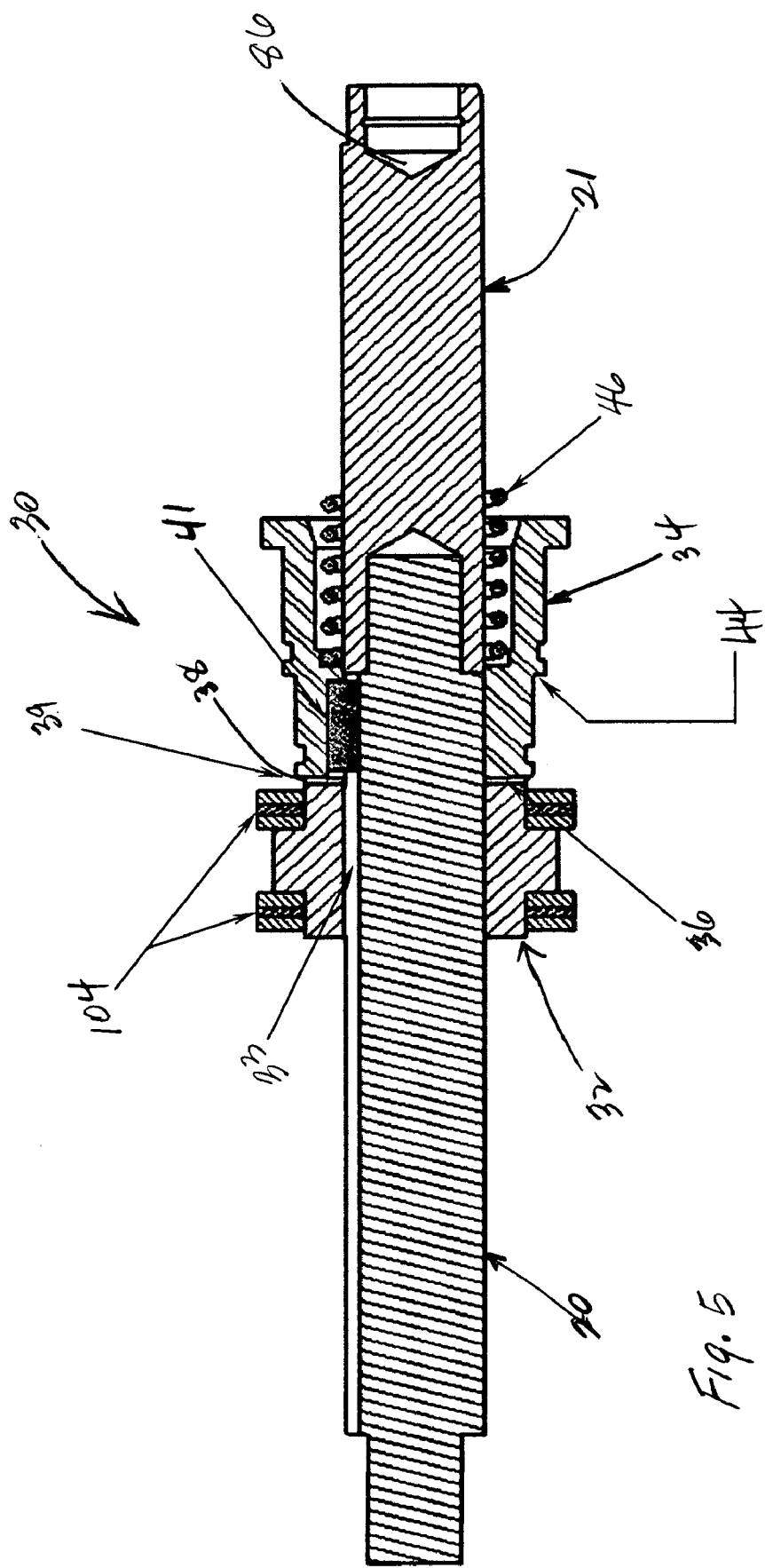
FIG. 5 is an enlarged sectional view of the locking mechanism of the present disclosure, the locking mechanism being in a locked position.

The brake system includes means or devices for unlocking a locked parking brake mechanism 30. The means includes an automatic, fluid pressure release device and a mechanical release device. As seen in FIGS. 3-5 but shown best in FIG. 5, locking mechanism 30 is shown in a locked position with the first surface 36 of the nut 32 engaged (see 39) with the second surface 38 of the sleeve 34. Regarding the automatic, fluid pressure release device, brake cylinder 10 includes second port 40 on housing 12 configured to receive fluid pressure from brake pipe 28. A conduit 42 connects port 40 with contact area 44 on an outside diameter area of locking sleeve 34. As suggested in FIG. 6, the locked parking brake locking mechanism 30 is unlocked or released by applying fluid pressure from brake pipe 28 through port 40 and conduit 42 onto contact area 44, thereby driving locking sleeve 34 off locking nut 32 by disengaging (see 45) surfaces 36 and 38. When brake pipe pressure is removed from contact area 44, spring 46 returns locking sleeve 34 to engage locking nut 32 and once again the locking mechanism 30 is in a locked position. Thus, removal of brake pipe pressure would occur if the brake pipe broke or the rail vehicle was parked and the train brake pipe was disconnected.

Figure 7:
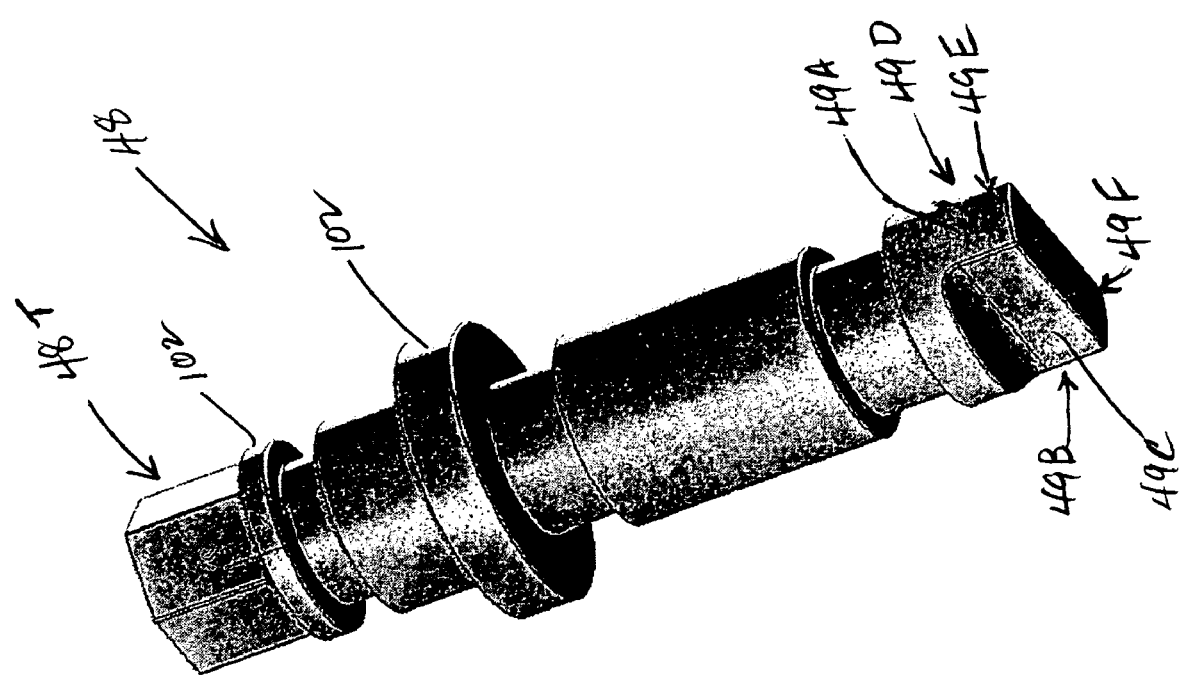
FIG. 7 is a perspective view of a movable element, shown as a rotatable stem, according to the present disclosure.

Regarding the mechanical release of the locked locking mechanism 30, brake cylinder 10 includes a movable element 48, shown as a rotatable stem and best seen in FIG. 7, but also shown in FIGS. 2-4 and 8-10. Rotatable stem 48 is essentially enclosed in cover 16. Stem 48 includes a stem turning surface 48 at a first end configured to receive, for example, a wrench or similar tool for rotation of the stem 48. It is within the scope of this disclosure that movable element 48 be configured to be movable by other than rotation and by manual or fluid-driven operation. A stem protrusion 49 is located at a second or opposite end of stem 48 and includes front and rear stem surfaces 49A, 49B, left and right side surfaces 49C, 49D and front and rear stem edges 49E and 49F. Stem edge 49E is at the intersection of side surface 49D and front surface 49A while stem edge 49F is at the intersection of side surface 49C and rear surface 49B. Stem edges 49E and 49F are configured to engage sleeve contact area 50 of locking sleeve 34 when stem 48 is rotated counter-clockwise or clockwise, respectively.

Figure 8:
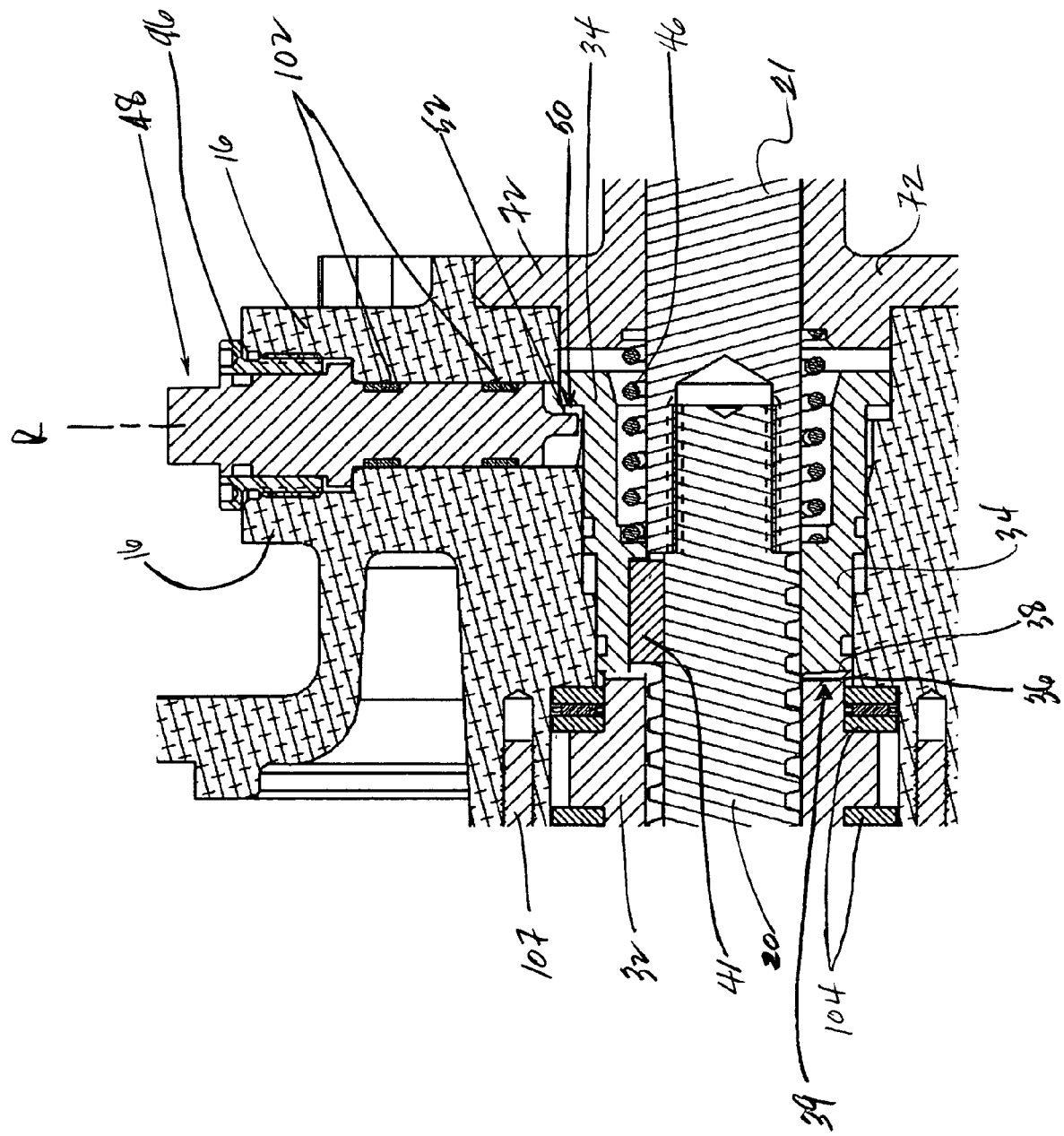
FIG. 8 is an enlarged sectional view showing a portion of the brake cylinder of FIG. 3 including a first element (shown as a locking nut) and a second element (shown as a locking sleeve) of the locking mechanism being in a locked position and the movable element being in a neutral position not in contact with the locking sleeve.
Figure 9:
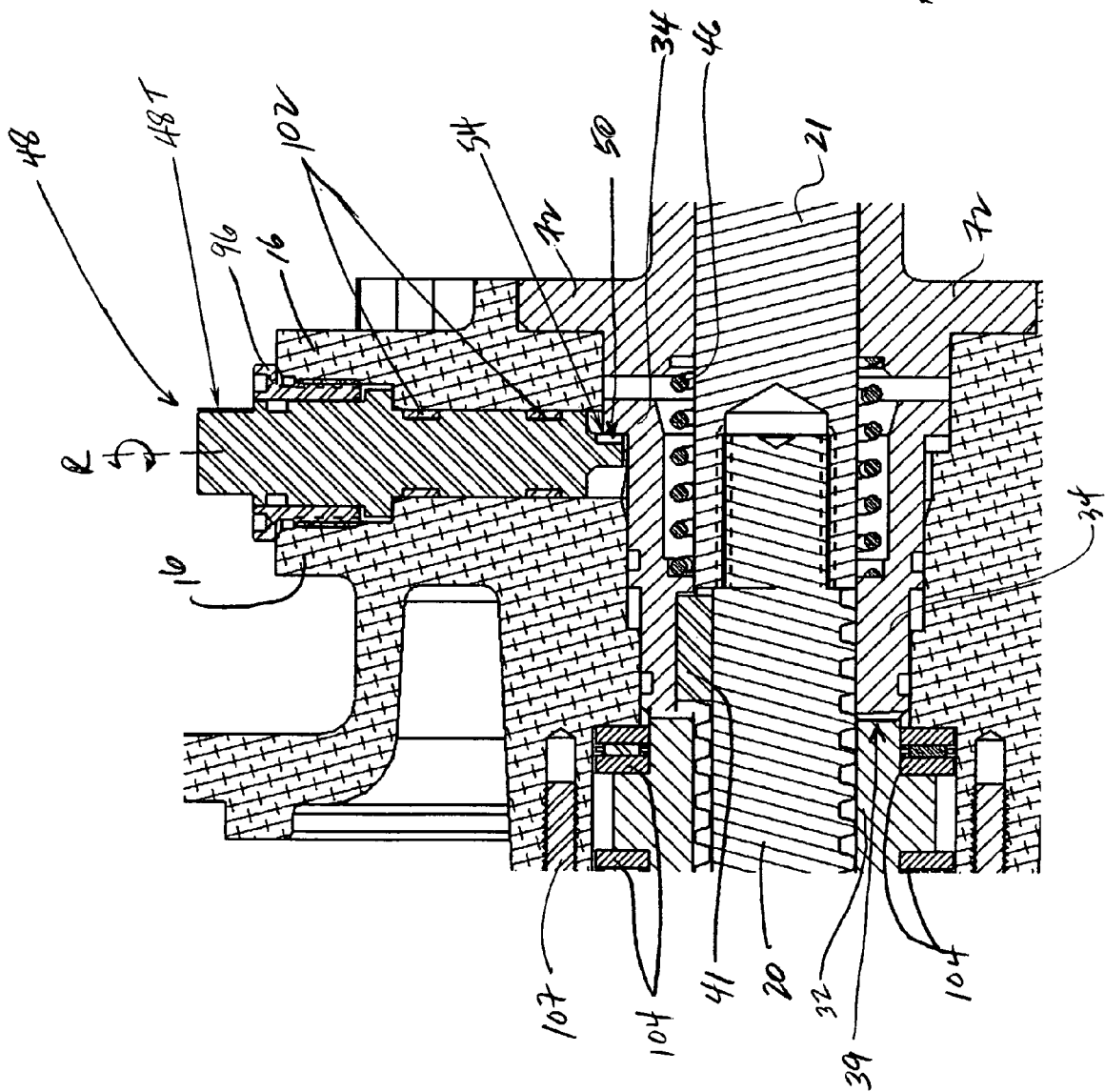
FIG. 9 is an enlarged sectional view of the brake cylinder, similar to FIG. 8, but showing the movable element being in a partially-rotated position and a portion of the movable element being in contact with the locking sleeve.
Figure 10:
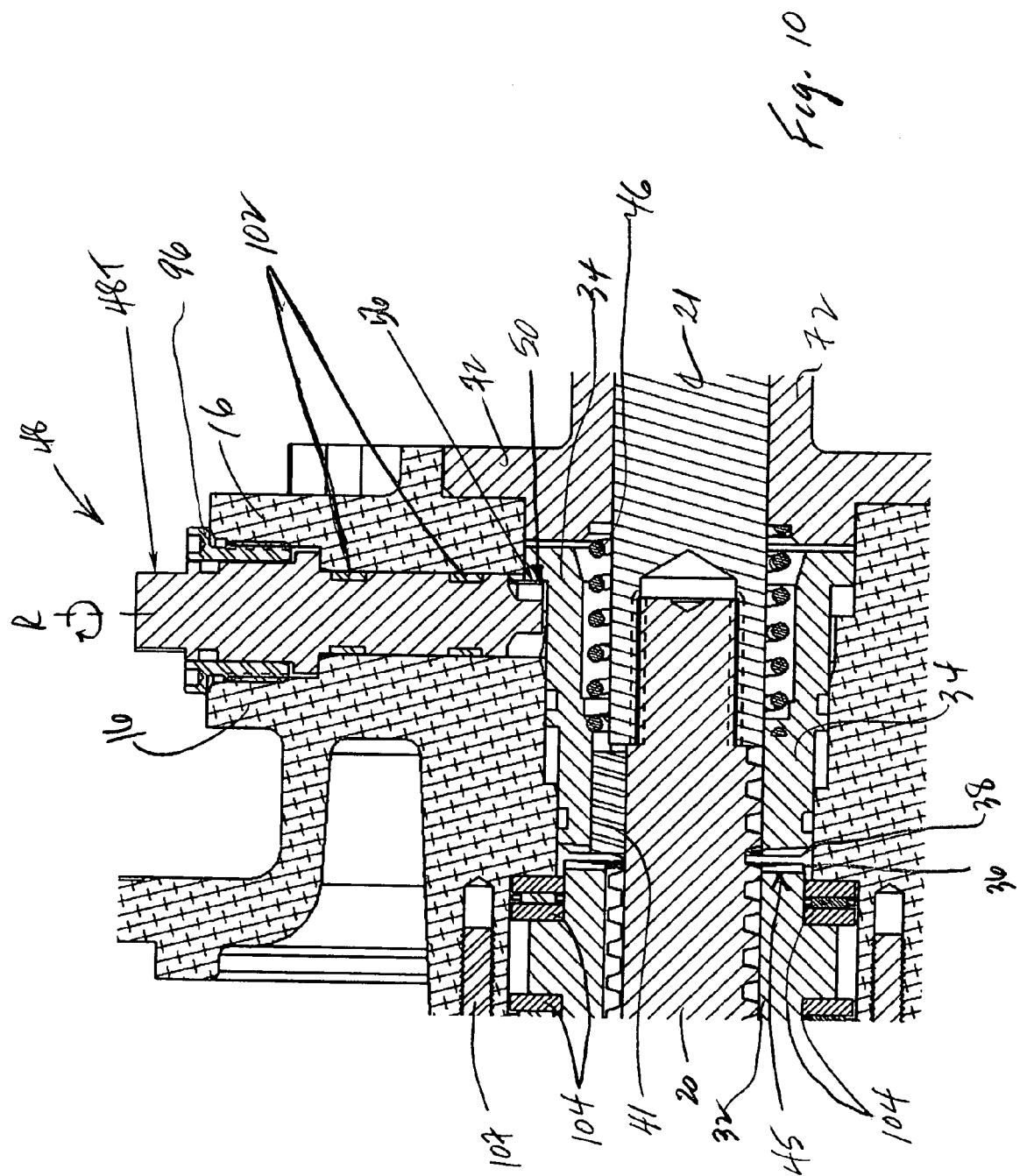
FIG. 10 is an enlarged sectional view of the brake cylinder, similar to FIG. 8, but showing the movable element in a further-rotated position such that the movable element has driven the locking sleeve off the locking nut, thereby placing the locking mechanism in an unlocked position.

As shown in FIG. 8, locking mechanism 30 is in a locked position with the first and second surfaces 36, 38 engaged, as seen at 39. Stem 48 is in a neutral position, not engaged with locking sleeve 34, as evidenced by space 52. As shown in FIG. 9, when stem 48 is partially rotated clockwise about rotational axis R, stem edge 49F makes contact with locking sleeve contact area 50 at point 54 but locking nut 32 and locking sleeve 34 remain engaged, as seen at 39. After additional clockwise rotation of stem 48, as suggested in FIG. 10, stem edge 49F fully engages (see 56) contact area 50 and drives locking sleeve 34 off locking nut 32 thereby disengaging (see 45) surfaces 36 and 38. When the applied force is removed from turning surface 48T, spring 46 moves locking sleeve 34 back toward locking nut 32 causing stem edge 49F to be driven off contact area 50 and stem 48 returns to the neutral position, as shown in FIG. 8. Spring 46 further moves locking sleeve 34 such that surfaces 36 and 38 reengage with each other.

As shown in FIGS. 1-4, brake cylinder 10 includes the pressure body 14 coupled and sealed to cover 16 by gasket 58, bolts 60 and washers 62, which forms part of housing 12. Pressure piston 18 is seated against packing cup 64 and guide ring 66 at one end inside pressure body 14. Pressure piston 18 is secured to threaded first shaft 20 by nuts 68 and washers 70. First shaft 20 is secured to second shaft 21 by a threaded connection. Cap 72 encloses an opposite end of the housing 12 and is sealed by O-ring 74. Wiper 76 prevents debris from entering housing 12 through cap 72. Cap 72 is secured by screws 78 to cover 16. Rod 22 is coupled to second shaft 21 by a clip 80 and the clip 80 is secured in a shaft retaining groove 82 and enclosed by boot 84. Rod 22 can pivot within the shaft retaining groove 82 due to a spherical end 86 and clip 80. Rod 22 is thus allowed to self-align itself to, for example, a lever connection (not shown) coupled at one end to the rail vehicle's brakes and at another end to rod 22. A brake pipe bracket 88 for connection to brake pipe 28 and a sealing ring 90 are secured to cover 16 by bolts 92. Brake cylinder 10 is mountable, for example, to a bolster on a rail vehicle (not shown) by studs 94.

The rotatable stem 48 is shown mounted in opening 95 in the cover 16 of housing 12. Stem 48 is secured in the opening 95 by a threaded connection of cap 96 with cover 16. O-rings 98 and 100 provide a seal for stem 48 and cap 96 to prevent debris from entering the housing 12. Wear rings or bearings 102 provide a running surface between the stem 48 and cover 16.

Locking mechanism 30 is mounted inside housing 12 and includes locking nut 32 and thrust bearings 104. Locking nut 32 rotates about shaft 20 in one direction during a brake apply operation and in an opposite direction during a brake release operation. Nut 32 and bearings 104 are secured or captured by a plate 106 and screws 107. Locking sleeve 34 is connected to first shaft 20 by pin 41 which is configured such that it prevents sleeve 34 from rotating about shaft 20. Sleeve 34 also is connected to spring 46. Spring 46 is connected to or abuts cap 72 and is biased so as to return sleeve 34 to an engaged position with nut 32 in the absence of brake pipe pressure on sleeve 34. O-rings 108, 110 provide a seal between sleeve 34 and cover 16. Locking mechanism 30 essentially forms a locking clutch and is configured to lock in the absence of brake cylinder pressure on pressure piston 18 and in the absence of brake pipe pressure on locking sleeve 34. Thus, locking mechanism 30 may lock in a brake applied or brake released position. Therefore, brake cylinder pressure is not necessarily needed to maintain the rail vehicle's brakes in a brake applied condition if brake pipe pressure is removed at port 40.

With regard to operation of brake cylinder 10, a first situation may find that a particular rail vehicle is part of a train in regular operation. Generally, with the train moving and not under braking, there is no brake cylinder pressure being applied at first port 24. However, because the brake pipe is charged, there is brake pipe pressure being applied at second port 40. Locking mechanism 30 is in an unlocked condition with surfaces 36, 38, respectively, of nut 32 and sleeve 34, disengaged because of the brake pipe pressure fed via conduit 42 onto sleeve 34, as shown in FIG. 6. When a service braking or emergency braking is applied to the rail vehicles of the train, fluid pressure from the reservoir is introduced at port 24 and brake cylinder 10 operates to move pressure piston 18 to apply the vehicle's brakes, and the rail vehicles come to a stop. The drop in pressure in the brake pipe 28 for a service or emergency brake is not sufficient to allow the locking mechanism 30 to lock the parking brake.

Brake cylinder pressure is now removed by increasing the brake pipe pressure. Thus, pressure piston 18 will be allowed to return to its released position, as shown, for example, in FIG. 3. Brake cylinder 10 is thus operating in a normal fashion with the locking mechanism 30 being maintained in an unlocked condition because of the presence of brake pipe pressure at port 40. In this situation, the locking mechanism 30 was not employed in a parking brake application mode because brake pipe pressure was not removed at port 40 while the rail vehicle's brakes were in an applied condition.

In a second situation, similar to the first situation except that after the rail vehicle is brought to a stop, the brake cylinder pressure at port 24 is maintained and the rail vehicle's brakes are in an applied condition. However, brake pipe pressure at port 40 is now removed. Thus, with brake pipe pressure now off of locking sleeve 34, spring 46 positions sleeve 34 against nut 32, thereby engaging surfaces 36 and 38 and locking the locking mechanism 30. Brake cylinder pressure at port 24 can now be removed and the force produced by the brake cylinder 10 to apply the rail vehicle's brakes will be maintained. Locking mechanism 30 is thus now employed as a parking brake.

To release the parking brake, or the locked locking mechanism 30, two options are available. First, brake pipe pressure can be applied through port 40 and conduit 42 onto locking sleeve 34 which will drive locking sleeve 34 off locking nut 32 against the force of spring 46. This normally occurs when the rail vehicle is connected in a train. However, fluid pressure may be applied to the brake pipe 28 from any source. Consequently, spring 26 will fully retract pressure piston 18, thereby removing the braking force of brake cylinder 10 and the parking brake will be released.

An alternative parking brake release is also available. By moving, or in this case, a rotating stem 48 about axis of rotation R, either stem edge 49E or 49F will drive locking sleeve 34 off locking nut 32 against the force of spring 46. Consequently, as noted above, M the parking brake will be released.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

We claim:

1. A brake system for a rail vehicle responsive to fluid pressure signals from a fluid charged brake pipe to apply and release brakes of the rail vehicle, comprising:
   a brake cylinder including a housing, a port on the housing for receiving fluid pressure signals, a pressure piston carried inside the housing, and a shaft inside the housing, the shaft connected at one end to the pressure piston and at the other end to a device to apply and release the brakes of the rail vehicle;
   a parking brake locking mechanism located inside the housing, the locking mechanism including a locking nut and a locking sleeve configured cooperate to lock and unlock the parking brake locking mechanism; and
   the fluid charged brake pipe being connected to the housing and providing a fluid force directly on the locking sleeve of the parking brake locking mechanism to move the locking sleeve to unlock the parking brake locking mechanism from a locked position.

2. The system of claim 1, wherein the locking nut and locking sleeve are axially opposed.

3. The system of claim 1, wherein the locking nut is threadably connected to, rotatable about but not movable axially with the shaft, and the locking sleeve is rotationally fixed to but movable axially with and relative to the shaft.

4. The system of claim 3, wherein the locking nut includes a first surface and the locking sleeve includes a second surface, the first and second surfaces being axially opposed and axially engageable and disengageable.

5. The brake system of claim 1, wherein the locking sleeve is rotationally fixed to the shaft.

6. A brake system for a rail vehicle, comprising:
   a brake cylinder including a housing, a port on the housing for receiving fluid pressure signals, a pressure piston carried inside the housing, and a shaft inside the housing, the shaft connected at one end to the pressure piston and at the other end to a device to apply and release the brakes of the rail vehicle;
   a parking brake locking mechanism located inside the housing, the locking mechanism including first and second elements cooperating to lock and unlock the parking brake locking mechanism; and
   a movable device mounted on the housing and configured such that when the movable device is moved, at least a portion of the movable device engages with the second element to mechanically move the second element to unlock the parking brake locking mechanism from the locked position.

7. The system of claim 6, wherein the movable device is a rotatable stem seated in an opening of the housing.

8. The system of claim 7, wherein the rotatable stem includes a first end having a surface configured to mate with a turning device and further includes a second end configured to engage with and move the second element when the rotatable stem is turned by the turning device.

9. The system of claim 6, wherein the movable device is manually-operated.

10. The system of claim 6, wherein the movable device is fluidly-operated.

11. The system of claim 8, wherein the second end includes a plurality of surfaces creating at least two edges configured to engage and move the second element when the movable device is rotated.

12. The system of claim 7, wherein the rotatable stem is rotatable in a clockwise and a counter-clockwise direction.

* * * * *